Dec. 22, 1970    R. L. RISSER ET AL    3,548,574
MOWING DEVICE

Filed Aug. 21, 1968    2 Sheets-Sheet 1

INVENTORS
ROGER L. RISSER
EDWARD D. FOULKE
& HORACE G. MC CARTY
BY James J. Kennedy
ATTORNEY

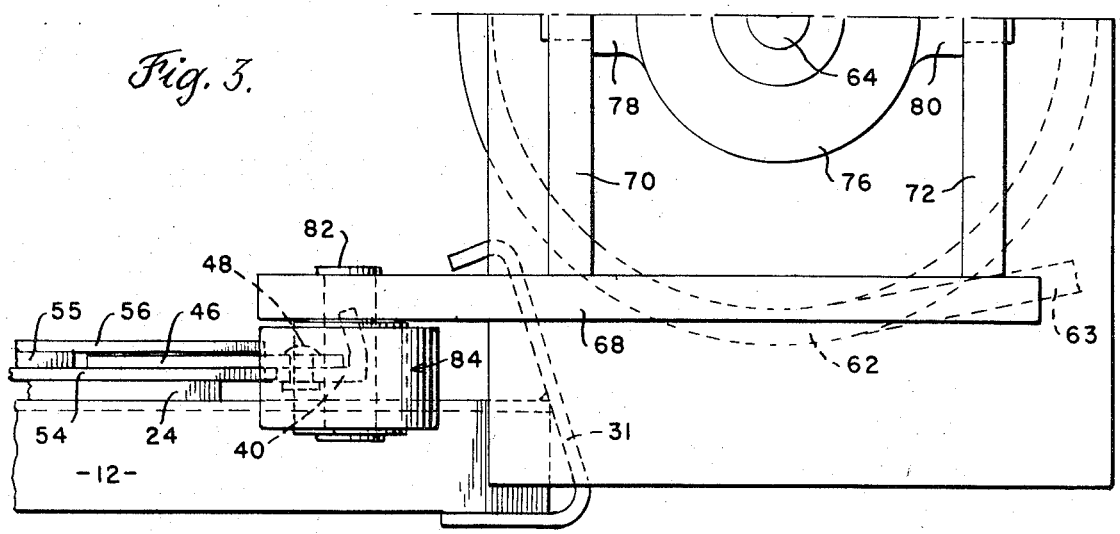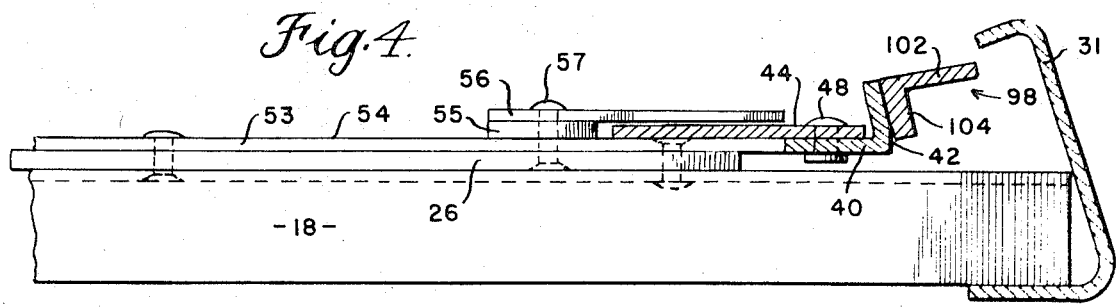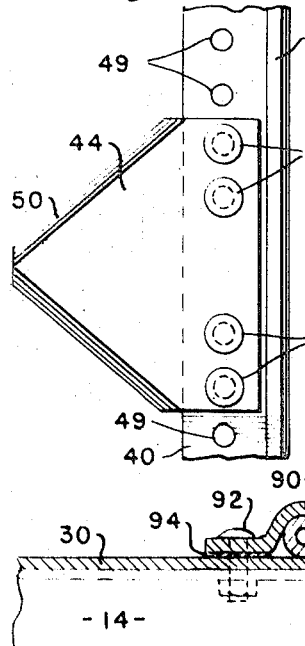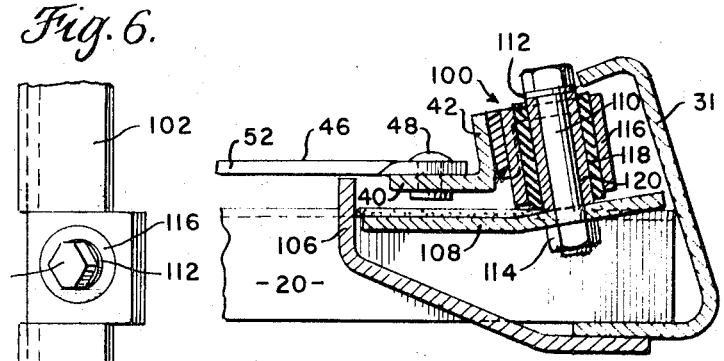

United States Patent Office 3,548,574
Patented Dec. 22, 1970

3,548,574
MOWING DEVICE
Roger L. Risser, Leola, Edward D. Foulke, Lancaster, and Horace G. McCarty, Leola, Pa., assignors to Sperry Rand Corporation, New Holland, Pa., a corporation of Delaware
Filed Aug. 21, 1968, Ser. No. 754,270
Int. Cl. A01d 55/02
U.S. Cl. 56—298
8 Claims

ABSTRACT OF THE DISCLOSURE

A mowing device having a frame, a sickle reciprocably mounted with respect to said frame, a drive mechanism disposed in close proximity at one end of the sickle for transmitting motion thereto and a resiliently, pivotally connected angled back-up support bar which exerts a downward force on the sickle and cooperates with the front side knife hold downs to produce a clean shearing action as the sickle reciprocates.

BACKGROUND OF THE INVENTION

Generally speaking, the sickle bar mounted in a conventional mowing machine is manufactured from a long piece of flat bar stock which is securely constrained within the mowing machine close and substantially parallel to the ground so that it will be free to move in the lateral direction but not in the fore-and-aft direction as the sickle is reciprocated. Gradually, however, even the most well constrained sickle begins to wear as it reciprocates in its plane parallel to and spaced above the ground in the frame structure. If a conventionally designed sickle bar, having a series of constraints therealong to prevent fore-and-aft movement, is reciprocated and the driving force is not strictly linear, then both the sickle bar and the constraining members will be caused to wear at a faster rate than they would be if a pure linear input reciprocation were used. The resulting wear causes misalignment and excessive wear increases the possibility of relative movement of the parts leading to the build up of noise.

When a drive system, such as the one shown and described in S.N. 442,021, now Pat. No. 3,444,676, for example, is used to supply the motive force to the sickle the resulting motion is not purely linear, but, instead, the resulting driving motion is slightly arcuate. The particular drive system described in the above-mentioned co-pending application is a wobble type drive using a short drive arm which extends from the wobble yoke to the sickle and is connected thereto. Since the motion of the drive arm is oscillatory, the path traced by the vertical axis of the connecting means between the drive arm and the sickle is an arc. This arcuate motion, then, not only produces a lateral or reciprocating motion component, but it also produces a fore-and-aft motion component which, if the sickle is over constrained, can cause severe wear problems, or even failure of the sickle bar.

To eliminate wear in this type of equipped mowing machine, a pivoted back-up bar was developed so that the reciprocating sickle bar would be restricted as to the fore-and-aft motion thereof but would permit a yieldable support due to the pivotal nature of the back-up bar. This design was suitable, but still it has been found under certain conditions that the knives fastened to the sickle were rendered less effective because they were being lifted upwardly from the side knives with which they cooperate to cut standing crop materials by the wedging action of the crop materials between the side knives and the cutting knives on the sickle bar. Optimum clean shearing was achieved when a downwardly exerted force was applied to the sickle bar and the knives.

The previously available sickle assemblies used constraining members including knife clips, therealong which required a great deal of time to be set up for first use and then very frequent adjustments had to be made during operation of the machine to maintain optimum cutting characteristics.

SUMMARY OF THE INVENTION

Accordingly, an object of the present invention is to provide for a positive downwardly exerted force to be applied to the sickle bar and the knives while maintaining the pivoting feature of the back-up bar by providing an angled back-up support bar.

A second object of the present invention is to eliminate the wear clips normally used on sickle knife assemblies and provided instead a front mounted knife hold down which extends rearwardly over the knife assembly cleaner sections while exerting a downward force on those sections to provide optimum shearing action.

Further, the present invention provides an improved means for mounting the knife blades to the sickle bar which will strengthen the mounting and also provide a more efficient operating machine under extreme cutting conditions.

Still further, a mowing device using the present invention will have a sickle which is quiet and smooth running during the operation thereof.

Another object of the invention is the development of a mowing device which does not require a time consuming set up operation or frequent adjustments during use of the machine.

BRIEF DESCRIPTION OF THE DRAWINGS

FIG. 3 is an end view taken as indicated by the line 3—3 in FIG. 1.

FIG. 4 is an enlarged section view taken along the line 4—4 as indicated in FIG. 1.

FIG. 5 is an enlarged section view showing the center pivot and its relationship to the sickle bar and taken along the line 5—5 of FIG. 1.

FIG. 6 is a plan view of the center pivot area of the angled backup support.

FIG. 7 is a fragmentary detail view of the rivet arrangement of the proposed invention.

FIG. 8 is a section view taken on the line 8—8 of FIG. 1.

DESCRIPTION OF THE PREFERRED EMBODIMENT

Figure 1:
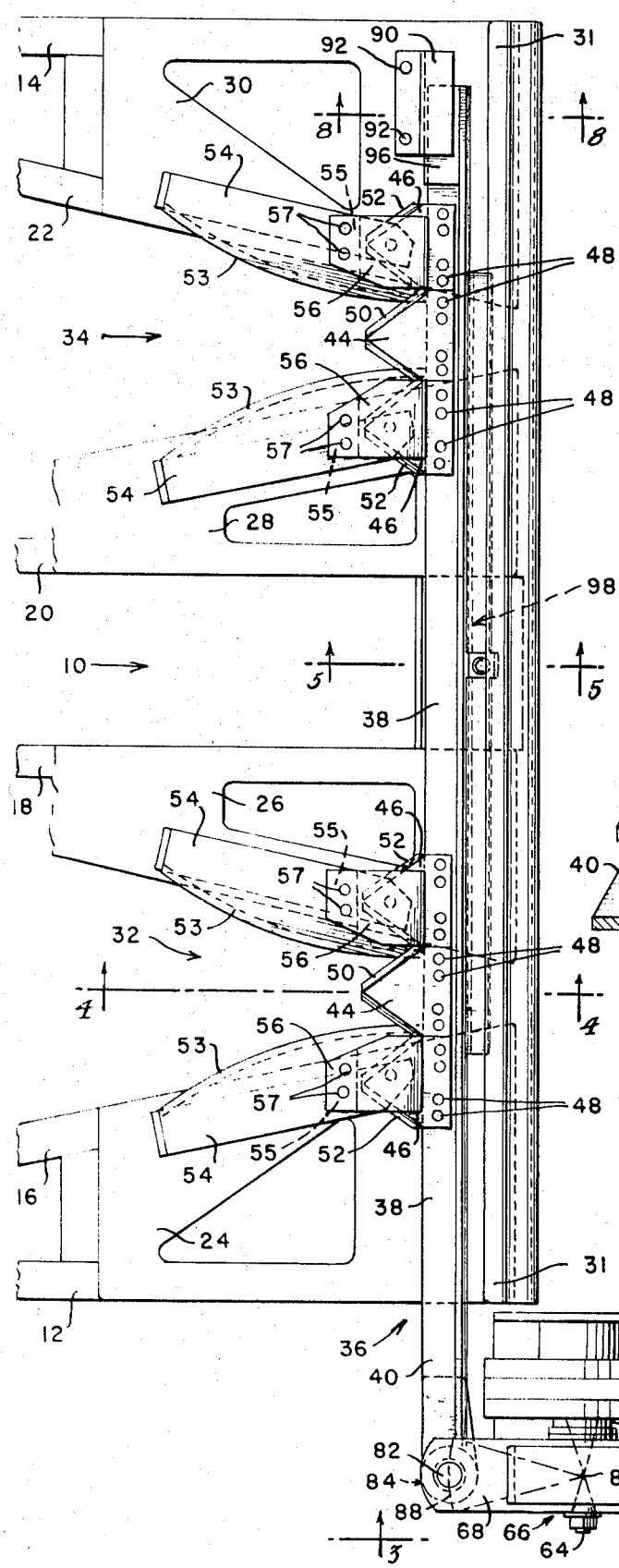
FIG. 1 is a plan view of the proposed invention, the elements being shown in their operating relationship.

Referring to FIG. 1, a row crop attachment or header 10 for a harvesting machine, of the type shown in U.S. Pat. No. 3,352,093 Procter, is adapted to be fixed to the forward end of a harvesting machine, or the like (not shown), for movement forwardly over the ground therewith. The header 10 has a frame structure which is comprised on a pair of side frame members 12 and 14, and a plurality of fore-and-aft extending frame members 16, 18, 20 and 22. The frame structure reinforced by the addition of plate members 24, 26, 28 and 30 which are fixed to and extend across the fore-and-aft frame members by any suitable means (not shown). A rear frame member 31, a generally C-shaped channel element, extends from side frame to side frame transverse to the fore-and-aft frame members and transverse to the direction of travel of the header 10. Crop material, such as standing corn, or the like, is fed into the machine header as it moves along the ground. The crop material passes through stalk passages 32 and 34 and is directed toward the cutting elements of the header to be harvested.

Also extending transversely of the fore-and-aft frame elements, but ahead of transverse frame 31 of header 10, is a sickle means 36. The sickle means 36 is comprised of a generally L-shaped sickle bar 38 having a forwardly extending leg 40 and an angularly disposed leg 42 which extends angularly upwardly from the rearward end of the forward extending leg 40, as best seen in FIGS. 2, 4, 5 and 8. A plurality of cutting knife elements 44 and stripping knife elements 46 spaced in groups along the sickle bar and fixed to the forward extending leg 40 thereof by a plurality of spaced rivets 48, also comprise part of the sickle means. The rivets are symmetrically arranged in pairs along the knife elements, as shown in FIGS. 1 and 7, so that the rivets extend through the knife elements and through the apertures 49 provided in leg 40 of sickle means 36. By using four rivets and spacing them in pairs close to the edge of the knife section instead of using two or three rivets as is conventionally done, the mounting strength of the knife with respect to the sickle bar is greatly increased. The increased strength is a necessary feature when cutting heavy corn stalks in the dry, mature condition, since it also tends to hold the knives firmly down against the sickle bar during the extreme operating conditions.

Each cutting knife 44 is provided with serrated edges 50 and is disposed between a pair of stripping knives 46, as shown in FIG. 1. Each of the stripping knives 46 is provided with blunt edges 52. The cutting knife 44 is the primary cutting element since crop material is severed between the serrated edegs 50 and edge 53 of side knives 54 which are mounted ahead of the sickle bar 38 on the frame structure, but below knives 44 and 46, as shown in FIG. 4. The side knives 54 extend laterally into the stalk passage and are fixed to the frame structure by any suitable means (not shown). By this arrangement, the stripping knives 46 serve to strip stringy crop material left on the side knives 54 after the knife 44 has cut the crop material which had been directed thereto. This prevents the build up of crop material at the cutting area and insures a clean, sharp cut on each stroke.

Front knife hold down means 56 are suitably mounted on the frame structure ahead of the knives 44 and 46 by means of rivets 57 and as shown in FIGS. 1 and 4. The rivets 57 extend downwardly through the hold down means 56, through spacer 55, through the side knives 54 and into the respective cover plates. As can be seen in detail in FIG. 4, the hold downs are spaced above the knives by the spacer 55 so that the reciprocating knife blades 44 and 46 move in a spaced relation thereto beneath the hold down and above the side knife. While the knives do not normally contact the hold downs 56, they do engage the side knives 54 as they reciprocate back and forth thereover. The edges of the side knives and hold downs present a suitable shearing surface for the reciprocating knives 44 and 46. As the knives 44 and 46 are forced upwardly under the wedging action of the crop material being fed thereto, the hold down 56 constrains the upward motion of the knives lessening the chance knives will be lifted from contact with the side knives to reduce the shearing action. The front hold downs 56 also serve to lessen wear inasmuch as they keep the sickle down so that it is not permitted to flop up and down with respect to the side knives, or become "sloppy" under load operating conditions.

One end of the sickle means 36 extends beyond the frame structure, as shown in FIG. 1, and is connected to a drive means 58. The drive means 58 is comprised of a drive shaft 60, journalled on the frame structure, a pulley 62 disposed on the drive shaft for rotation therewith, a belt drive 63, a wobble shaft 64 extending angularly outwardly from the drive shaft 60, a wobble unit 66 and a drive arm 68 connected to the wobble unit 66 for oscillation therewith. The wobble unit 66 is comprised of a yoke member, including upstanding arms 70 and 72 and a bight portion 74 connecting the legs at the upper ends thereof, and a wobble housing 76 having a pair of outwardly extending arms or trunions 78 and 80 which are journalled in upstanding arms 70 and 72, respectively, as shown in FIGS. 1 and 3. The drive arm 68 is secured to the ends of the upstanding arms 70 and 72, as shown in FIGS. 1 and 3, and extends toward the sickle bar 38. The outer end of the arm is adapted to receive a pin member 82, having a vertically extending axis, which extends through the arm and into a bushing element 84 to connect the sickle bar 38 to the drive arm.

The belt 63, driven by a suitable power source (not shown), supplies motive force to pulley 62 and drive shaft 60. As the drive shaft turns the wobble unit 64 is also caused to turn. Since, by the nature of the drive unit, the horizontal and vertical axes all intersect within the yoke 66 at point 86, the rotary motion of the pulley input is transformed into an oscillatory motion at the drive arm 68 through the yoke structure. In other words, the point 86 (see FIG. 1), where all the axes intersect, is fixed and the oscillation of the drive arm takes place about that point. The path, described by the vertical axis of pin 82, traced by the line 88 shown in FIG. 1, is arcuate. The drive arm 68 oscillates the pin back and forth in a plane generally parallel to the ground and the arcuate motion is transmited to the sickle means 36 through bushing 84 to effect reciprocation of the sickle. As can be readily understood, because the reciprocable input to the sickle is not truly a straight line reciprocating force, the sickle bar 38 will be given a slight fore-and-aft force component. This fore-and-aft motion of the sickle bar as it reciprocates results in the build up of noise and part wear during the operation of the machine.

To prevent the forward motion of the sickle bar during the operation of the machine, a guide means is provided at the one end of the sickle bar 38. The guide means is comprised of a guide member 90 fastened to the frame by suitable means such as rivets or bolts 92 over a spacer 94, as illustrated in FIG. 8. The forward end of the guide member 90 is positioned closely adjacent the frame portion and spaced therefrom by spacer 94 and cover plate 30, while the rear end of member 90 extends substantially parallel to the frame portion and is spaced a greater distance therefrom than the first end. The sickle means 36 is disposed behind the guide member 90 in such a manner that forwardly extending leg portion 40 of L-shaped bar 38 is under the guide member 90. A substantially U-shaped wear plate 96 is wrapped around the forwardly extending leg portion 40 of sickle bar 38 and is fixed relative thereto by welding or the like, as shown in FIG. 8. The wear plate 96 is adapted to fit under guide means 90 as shown in FIG. 8, so that the upper and lower portions thereof are engageable with the underside of the guide 90 and the cover plate 30, respectively. Through this arrangement of elements, the outer end of the sickle bar is somewhat constrained and guided and kept from moving forwardly with respect to the frame structure during the operation of the machine. During a normal cutting operation the sickle bar 38 is forced rearwardly by the engagement thereof with the crop materials at the cutting areas. However, during the period when the sickle bar is still operating but crop materials are not being directed thereto, the guide means 90 plays an important role in preventing the sickle means from excessive forward movement with respect to the frame structure.

Mounted behind the sickle means 36 and in close proximity thereto is a back-up bar, shown generally by the number 98. Back-up bar 98 is pivoted intermediate the ends thereof by a pivot means 100. The bar 98 is an L-shaped member having a first leg 102 (FIG. 2) extending in a forwardly direction and a second leg 104 depending transversely from the forward end of leg 102. The back-up bar 98 is angularly disposed with respect to the plane of the horizontally extending sickle means 36 and to the frame structure. By this disposition, leg 104 extends parallel to the angularly upstanding leg 42 of the sickle means and in close proximity thereto, as shown in FIG. 4. The back-up bar 98 extends behind the leg 42 of sickle means 36 in such a manner that the ends of the bar overlap the cutting area in both directions as shown in FIG. 1. While a three row header is not shown, the elements are essentially the same, but their arrangement is slightly different. In a three row header, the back-up bar 98 extends behind two outside stalk passageways overlapping the cutting areas therein in a manner similar to that shown in FIG. 1.

Figure 2:
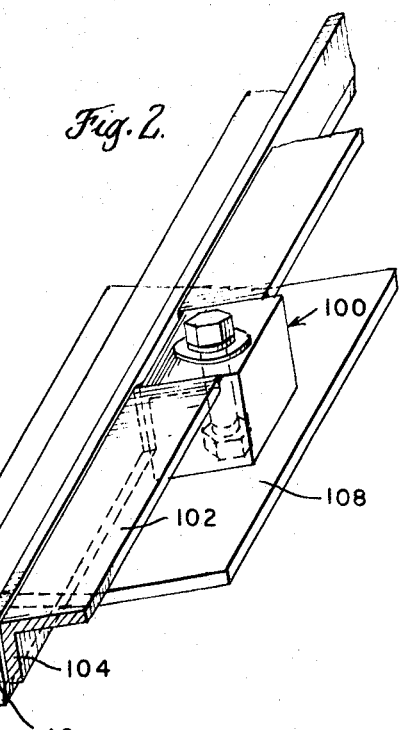
FIG. 2 is a perspective view showing the center pivoted angled back-up bar.

As shown in FIGS. 2, 5, and 6, pivot means 100 is mounted on a frame.

As shown in FIGS. 2, 5, and 6, pivot means 100 is mounted on a frame structure which is comprised of an upwardly opening generally C-shaped support frame 106 which extends between the frame elements 18 and 20 and rearward transverse fram 30 and is welded thereto, a support frame 108 having a forwardly extending portion and a rearwardly, angularly, upwardly extending portion which is fixed between frame elements 18, 20, 30 and 106. The pivot 100 is comprised of a bolt 110, a washer 112, a nut 114, an outer collar 116. a resilient bushing and an inner collar 120. The bolt 110 extends upwardly through the rearward, angularly, upwardly extending portion of plate 108, as shown in FIG. 5, so that the vertical axis thereof is inclined forwardly toward the sickle means 36. The bolt also extends through the inner collar 120, and washer 112 to the nut 114 which is fastened thereto. The resilient bushing 118 is bonded to the outer surface of collar 120 and to the inner surface of collar or hub portion 116. The inner collar 120 extends further in the axial direction than does the hub member 116 or the bushing member 118. Collar 120 is then fixed against rotation relative to the back-up bar and the frame and clamping structure by the bolt 110, washer 112 and plate 108. The back-up bar 98 is fixed to the outer collar 116 by any suitable means, such as welding or the like (not shown). In this way, the back-up bar and the pivot means 100 are operable as an interval unit.

In operation, the wobble unit 66 converts rotary motion to oscillatory motion which is, in turn, transmitted to the sickle means 36 causing it to reciprocate back and forth transversely of the frame structure of the header 10. Since the motion transferred from drive arm 68 to the sickle bar 38 through bushing 84 follows a slightly arcuate path, the driven end of the sickle is caused to have a fore-and-aft motion as well as a reciprocable motion component. The back-up bar 98 pivots about pivot means 100 in response to the fore-and-aft motion of the driven end of the sickle relative to the frame as it reciprocates, the pivoted motion of the back-up bar being taken up in the twist of the resilient bushing at the pivot point. Since back-up bar 98 is fixed to hub 116, the hub is caused to twist with the bar. However, the resilient bushing is bonded to both hub 116 and collar 120, and collar 120 is fixed relative to the hub 116 and, therefore, the twist or rotation of hub 116 with respect to collar 120 is completely absorbed or taken up by the resilient bushing 118. The back-up bar physically lends rearward support to the rearward angularly extending leg 42 of the sickle bar and further, it limits the rearward motion of the sickle bar during operation thereof. Because the back-up bar is angularly disposed with respect to the plane of the sickle the back-up support bar not only resists the rearward thrust of the sickle knife during the cutting operation, but it also exerts a downward force that keeps the knife cutting sections tight against the side knives. This downward force component on the knives is applied to the toe, or forward portion of the knife as well as the heel or rearward portion of the knife because of the disposition of the back-up bar to the sickle bar. The back-up bar contacts the sickle bar leg 42 in such a manner that the turning moment is applied to the sickle bar above the plane of the sickle. In this mode of operation, the optimum in clean shearing of material is achieved. The forces applied to the rear leg of the sickle bar is the resultant force of a downward and forward force applied by the back-up bar. In this way, the contact wear area of the angled back-up bar can be three times that of a perpendicularly disposed flat back-up bar, thus giving a much longer wear life on these normally replaceable parts.

The pivoting feature of the bar 98 permits some rearward movement of the bar so that the sickle is not rigidly constrained. This overcomes many of the previously encountered wear problems. The resilient bushing further limits the wear on parts because the pivoting action is taken up in the twist of the rubber which forms the bushing.

The bushing 118 is also effective to absorb transverse shock loads which are imposed on the sickle and the back-up bar during the normal operation of the machine and the resiliency of the rubber is effective to keep the back-up bar tight against the upstanding leg of the sickle bar.

The combination of the pivotal back-up bar with the resilient bushing, the front knife hold downs and the symmetrical disposition of the rivets fastening the knives to the sickle bar results in a smooth, quiet operating sickle which insures an optimum in clean cutting action and long wear life and a mowing machine that is easy to set up because it does not require any fore-and-aft shimming. This same combination is also extremely effective in increasing the wear life of the components and reducing the number of machine shut-downs for maintenance and repairs.

While the invention has been described and illustrated in its preferred embodiment it should be understood that the invention is not to be limited to the precise details herein illustrated that the same invention may be carried out in other ways falling within the scope of the invention claimed.

Having thus described our invention what we claim is:

1. In a mowing device, including a frame structure adapted for forward movement over the ground, a reciprocable sickle bar extending horizontally across said frame transverse to the direction of travel thereof and supported thereby, a plurality of knives mounted along said sickle bar for cutting crop material directed thereto, drive means on said frame for changing a rotary input motion into an oscillatory output motion and transferring said output motion to said sickle bar to effect reciprocation thereof, means connecting said drive means to one end of said sickle bar and transmitting a lateral component of reciprocation and a fore-and-aft component of reciprocation to the sickle bar, the improvement comprising: hold down means mounted forwardly of said knives and fixed relative thereto and limiting the upward movement thereof when said knives are lifted into engagement therewith during the cutting operation, angled back-up means disposed behind the sickle bar and pivotally mounted with respect thereto for limiting the rearward motion thereof and applying a positive downward force on said sickle bar, and a resilient pivotal connecting means pivotally mounting said back-up means on said frame whereby the fore-and-aft movement of the sickle bar is limited by the back-up means and the downward force applied to the knives by the back-up means and the limitation of upward movement by the knives relative to the hold down means provides an optimum in shearing action.

2. A mowing device comprising in combination:
   a frame structure adapted for forward movement over the ground;
   a reciprocable sickle bar extending horizontally across said frame structure transverse to the direction of travel thereof and supported thereby;
   a plurality of knives mounted along said sickle bar for cutting crop material directed thereto as said frame structure moves across the ground;
   hold down means mounted forwardly of said knives and fixed relative thereto for limiting the upward movement of said knives during the cutting operation;

drive means on said frame at one side thereof for changing a rotary input motion into an oscillatory output motion and transferring said output motion to said sickle bar to effect reciprocation thereof;

means connecting said drive means to one end of said sickle bar and transmitting a lateral component of reciprocation and a fore-and-aft component of reciprocation to said sickle bar;

angled back-up means disposed behind said sickle bar and pivotally mounted with respect thereto for limiting the rearward movement and applying a positive downward force on said sickle bar; and resilient pivotal connecting means for pivotally mounting said back-up means on said frame whereby the fore-and-aft movement of said sickle bar is limited by the back-up means and pivotal connecting means and the downward force applied to the knives by the back-up means and the limitation of upward movement by the knives relative to the hold down means provides an optimum in shearing action.

3. A mowing device, as recited in claim 2, wherein means are provided on said frame adjacent one end of said sickle bar for guiding the reciprocation of the sickle bar and limiting the forward motion thereof.

4. A moving device, as recited in claim 2, wherein said knives extend forwardly of said sickle bar and said hold down means are fixed relative to said frame structure in spaced relation thereto and extend rearwardly in spaced relation over the forwardly extending knives to limit the upward travel of said knives with respect to side knives during reciprocation of said sickle bar knives.

5. A mowing device, as recited in claim 2, wherein said back-up means is comprised of a substantially L-shaped member having a forwardly extending leg and a downwardly extending leg, said back-up means being angularly disposed with respect to a plane formed by said horizontally extending sickle bar to apply a downward force to the sickle bar above the plane of the sickle bar.

6. A mowing device as recited in claim 5, wherein said sickle bar is comprised of a first forwardly extending leg and a second leg extending angularly upwardly from the rearward end of said forwardly extending leg and the downwardly extending leg of said back-up means is in engagement with and extends parallel to said angularly disposed leg of said sickle bar.

7. A mowing device, as recited in claim 2, wherein said resilient pivotal connecting means is fixed relative to said frame structure and said back-up means is fixed to said resilient pivotal connecting means so that pivotal movement of said back-up means with respect to said frame structure is taken up by twisting movement of said resilient pivotal connecting means.

8. A mowing device as recited in claim 2, wherein said resilient pivotal connecting means is angularly disposed with respect to said frace structure and a plane formed by the horizontally extending sickle bar.

References Cited
UNITED STATES PATENTS

| | | | |
|---|---|---|---|
| 2,528,659 | 11/1950 | Krause | 56—298 |
| 3,444,676 | 5/1969 | Hale et al. | 56—296 |

LOUIS G. MANCENE, Primary Examiner

J. A. OLIFF, Assistant Examiner

U.S. Cl. X.R.

56—307